United States Patent [19]
Kato et al.

[11] Patent Number: 5,745,205
[45] Date of Patent: Apr. 28, 1998

[54] METHOD OF INTRODUCING SLIGHTLY TITLTING HOMEOTROPIC ORIENTATION INTO LIQUID CRYSTAL, LIQUID CRYSTAL ELECTRO-OPTICAL DEVICE, AND LIQUID CRYSTAL LIGHT VALVE

[75] Inventors: Naoki Kato; Rieko Sekura; Tadao Iwaki, all of Chiba, Japan

[73] Assignee: Seiko Instruments Inc., Japan

[21] Appl. No.: 554,681

[22] Filed: Nov. 7, 1995

[51] Int. Cl.$^6$ .................................................. G02F 1/1337
[52] U.S. Cl. .......................... 349/125; 349/130; 349/128; 204/192
[58] Field of Search ................................. 359/76, 77, 75; 204/192

[56] References Cited

U.S. PATENT DOCUMENTS

| | | | |
|---|---|---|---|
| 4,043,647 | 8/1977 | Oue et al. | 350/320 |
| 4,112,157 | 9/1978 | Krueger et al. | 428/1 |
| 4,714,047 | 12/1987 | Ikeda et al. | 118/742 |
| 5,064,520 | 11/1991 | Miyake et al. | 204/192 |
| 5,186,977 | 2/1993 | Maezawa et al. | 427/132 |
| 5,325,137 | 6/1994 | Konno et al. | 359/72 |
| 5,498,762 | 3/1996 | Eguchi | 359/75 |

FOREIGN PATENT DOCUMENTS 0541388  5/1993  European Pat. Off. .

OTHER PUBLICATIONS

PHYS. STAT. SOL., vol. 70, No. 1, ISSN 0031–8965, Mar. 16, 1982, East Germany, pp. K43–K46, Hauck, G., "Liquid Crystal Alignment on Obliquely Deposited Al$_2$O$_3$ Surfaces".

SID International Symposium, Digest of Technical Papers, San Diego, CA, USA, Apr. 18–20, 1978, pp. 66–67, Gary A. Dir et al., "A Vacuum Deposition Alignment Technique for Tilt Control in Liquid Crystals".

Japanese Journal of Applied Physics, Part 2, vol. 21, No. 12, ISSN 0021–4922, Dec. 1982, Japan, pp. L761–L763, Hiroshima, K., "Controlled High–Tilt–Angle Nematic Alignment Compatible With Glass Frit Sealing".

*Primary Examiner*—William L. Sikes
*Assistant Examiner*—Julie Ngo
*Attorney, Agent, or Firm*—Adams & Wilks

[57] ABSTRACT

An object of the invention is to provide a method of introducing sightly tilting homeotropic orientation into a liquid crystal layer by oblique evaporation of inorganic material by one step, and a further object is to apply this method to provide a reliable liquid crystal electro-optical device or a liquid crystal light valve.

FIG. 1 shows an example of the method to introduce the slightly tilting homeotropic orientation into the liquid crystal layer by the one step of the oblique evaporation of the inorganic material. The orientation film is formed by the one step oblique evaporation. An incident angle is set from 45° to 70° relative to a parallel direction of the substrate, and a film thickness is set to 20 nm through 500 nm measured during the film deposition by a film thickness gage disposed at a vertical distance equal between the evaporation source and the substrate. The orientation film is used in the liquid crystal electro-optical device or the liquid crystal light valve.

33 Claims, 6 Drawing Sheets

○ Film thickness 1000 A
□ Film thickness  600 A

| d \ Ψ | 54 | 57 | 60 | 69 | 78 | 87 |
|---|---|---|---|---|---|---|
| 20 | × | × | × | × | × | × |
| 60 | ○ | ○ | △ | × | × | × |
| 100 | ○ | ○ | △ | × | × | × |
| 140 | ○ | ○ | ○ | × | × | × |

Note: ○ ; Uniform homeotropic orientation
△ ; Partial homeotropic orientation
× ; No homeotropic orientation

METHOD OF INTRODUCING SLIGHTLY TITLTING HOMEOTROPIC ORIENTATION INTO LIQUID CRYSTAL, LIQUID CRYSTAL ELECTRO-OPTICAL DEVICE, AND LIQUID CRYSTAL LIGHT VALVE

BACKGROUND OF THE INVENTION

The present invention relates to a method of introducing a slightly tilted homeotropic orientation into a liquid crystal. The liquid crystal layer having the homeotropic orientation is utilized as an optical modulation layer of an electro-optical device. Particularly, the present application is valuable when applied to a liquid crystal light valve used in an image projection apparatus and a high luminance image projection apparatus such as a video projector.

The methods of introducing the homeotropic orientation into the liquid crystal include a surface processing method by a silane coupling agent examplified by ODA and DMOAP having a long alkyl chain, a surface reaction method by a long chain alcohol or a long chain amine, and a coating method of a polymer material such as a polyamide and a polyamide having an alkyl side chain. These methods are common in that liquid crystal molecules are oriented in a direction of the long chain alkyl base by interaction between the long chain alkyl base exposed on the surface and the liquid crystal molecules.

In realizing the homeotropic orientation by means of these methods, it is necessary to introduce slight tilt into the liquid crystal alignment. For this, underlayer process is carried out such that silicon monoxide or the like is obliquely evaporated, oxide material is obliquely sputtered, or oxide material is sputtered while a substrate is moved, before the surface is processed by a silane coupling agent or the surface is treated by the long chain alcohol or the long chain amine.

Further, in case of using the polyamide, polyamide or the like, after forming the coating, a rubbing process thereof is carried out by a cloth.

A preferred method utilizes an evaporation apparatus installed with a mechanism for rotating an obliquely set substrate. An angular velocity of the rotation is controlled to impart a weight to the incident direction. Such a rotation oblique evaporation method is capable of controlling a tilt of the liquid crystal molecules along a boundary over a wide range. It is reported that the tilt orientation close to the vertical direction can be realized, by a reference paper (K. Hiroshima: Japanese journal of Applied Physics, 21, L761-L763 (1982)).

The liquid crystal layer having the homeotropic orientation is applied to the liquid crystal electro-optical device used in a color display or the like based on the ECB effect. Further, as disclosed in the U.S. Pat. No. 3,592,527 and others, the liquid crystal light valve is a device typically comprised of a photo-conductive layer, a light reflecting layer and a liquid crystal layer. A specific type of the liquid crystal light valve utilizes the above noted ECB mode where the nematic liquid crystal is homeotropically oriented in the liquid crystal layer, into, optical modulation layer. This type achieves high contrast, and performs optical amplification utilized in a high luminance image projection apparatus.

By introduction of the homeotropic orientation into the liquid crystal, it is rather easy to obtain the perfect vertical orientation to the substrate according to the above mentioned conventional methods. However, if an electric field is applied to the liquid crystal layer of the perfect vertical alignment, distortion may occur in the liquid crystal layer due to torque by coupling between the electric field and the negative dielectric anisotropy of the liquid crystal molecules. A director of the liquid crystal molecules is not restricted, thereby causing a mixed state of plural domains having different molecule directors to generate a discrimination line along borders of the domains. This discrimination line may degrade the contrast of a direct view type of display. Even worse, the discrimination line may seriously degrade resolution and contrast of the liquid crystal light valve used in the high luminance projector.

Therefore, as described before, the slightly tilted homeotropic orientation is introduced by the anisotropic treatment of the underlayer or by the after-treatment by rubbing.

However, obviously a complicated procedure is required for the anisotropic treatment of the underlayer and the coupling process. Such a method suffers from various drawbacks from an industrial point of view. Further, the surface subjected to the coupling process has a seriously poor adhesion to an adhesive, thereby hindering reliability of the device.

In the method of introducing the slight tilt by rubbing, the orientation film material importing the homeotropic orientation has a side chain of a long alkyl base. Therefore, the film is very soft and tends to scratch by the rubbing. Quite severe condition is required for the rubbing. It is difficult to obtain a stable tilt. Further, the rubbing step itself suffers from drawbacks such as generation and adhesion of dust by the rubbing.

The rotation evaporation method requires a quite special apparatus, where a rotation axis must coincide with a center of the substrate. Therefore, only one substrate is treated at a time by the evaporation step. Further, as the substrate size is made large, difference between the center and the periphery become significant to thereby hinder uniformity of the orientation. Such a method is never industrial.

In view of the above, the first and second methods of using the organic materials are practiced; however, these methods have the manufacturing problems as noted above, and may suffer from poor reliability due to the organic materials used.

Particularly, when the liquid crystal light valve is applied to the high luminance image projection apparatus, an intensive reading light is required. However, the organic orientation film generally used to vertically align the liquid crystal has poor light resistance due to its organic nature. Therefore, in the high luminance image projection apparatus using the strong reading light, the lifetime of the liquid crystal valve is extremely shortened, thereby necessitating frequent replacement of the liquid crystal light valve at a short interval.

As described above, the rotational oblique evaporation may ensure good light resistance; however, its application to the device manufacture is quite difficult.

SUMMARY OF THE INVENTION

Therefore, according to the present invention, the liquid crystal orientation film for introducing the homeotropic orientation is formed by vacuum-evaporating an inorganic material in a given direction tilted from a normal direction of the substrate under the condition that an incident angle $\psi$ is set in a range from 45° to 70° defined with reference to a direction parallel to the substrate and such that a thickness d of the orientation film is set in a range from 20 nm to 500 nm measured by a film thickness gauge disposed in a vertical direction at a distance equal between an evaporation source and the substrate during the film formation.

The inventive method carries out oblique evaporation only once in the same manner as the underlayer process of the coupling agent method, and is therefore remarkable to realize the slightly tilting homeotropic orientation.

Further, the invention realizes a liquid crystal electro-optical device having a high reliability and using the above orientation method, and particularly realizes the liquid crystal light valve applicable to the high luminance projector.

DETAILED DESCRIPTION OF THE PREFERRED EMBODIMENTS

The above described method can introduce the slightly tilting homeotropic orientation into the liquid crystal layer solely by the inorganic material by a single and simple step, thereby significantly improving the light resistance of the liquid crystal electro-optical device such as the liquid crystal light valve. This valve is applied to the high luminance image projection apparatus with less frequent replacement of the valve being needed, thereby advantageously realizing highly reliable products.

Conventionally, the evaporation angle range of 45° to 70° in the inventive oblique evaporation film is thought to provide homogeneous orientation or horizontal alignment. This is mentioned in "liquid crystal device handbook" PP. 242–247 edited by Nippon Gakujutsu Shinko-Kai 142-th section and published by Nikkankogyo Shinbun-Sha. However, as mentioned in a reference paper (W. A. Crossland et al., "Tilt angle measurements of nematic phases of cyano-biphenils aligned by obliquely evaporated films" J. Phys. D: Appl. Phys., Vol. 9, 1976), these results are observed in a film thickness range lower than the inventive film thickness range. According to the invention, the thickness of the single layer oblique evaporation film is made great at the specified incident angle range which conventionally belongs to the homogeneous orientation range, to thereby realize the homeotropic orientation performance.

Hereinafter, the present invention is described in detail with reference to the attached drawings.

Figure 1:
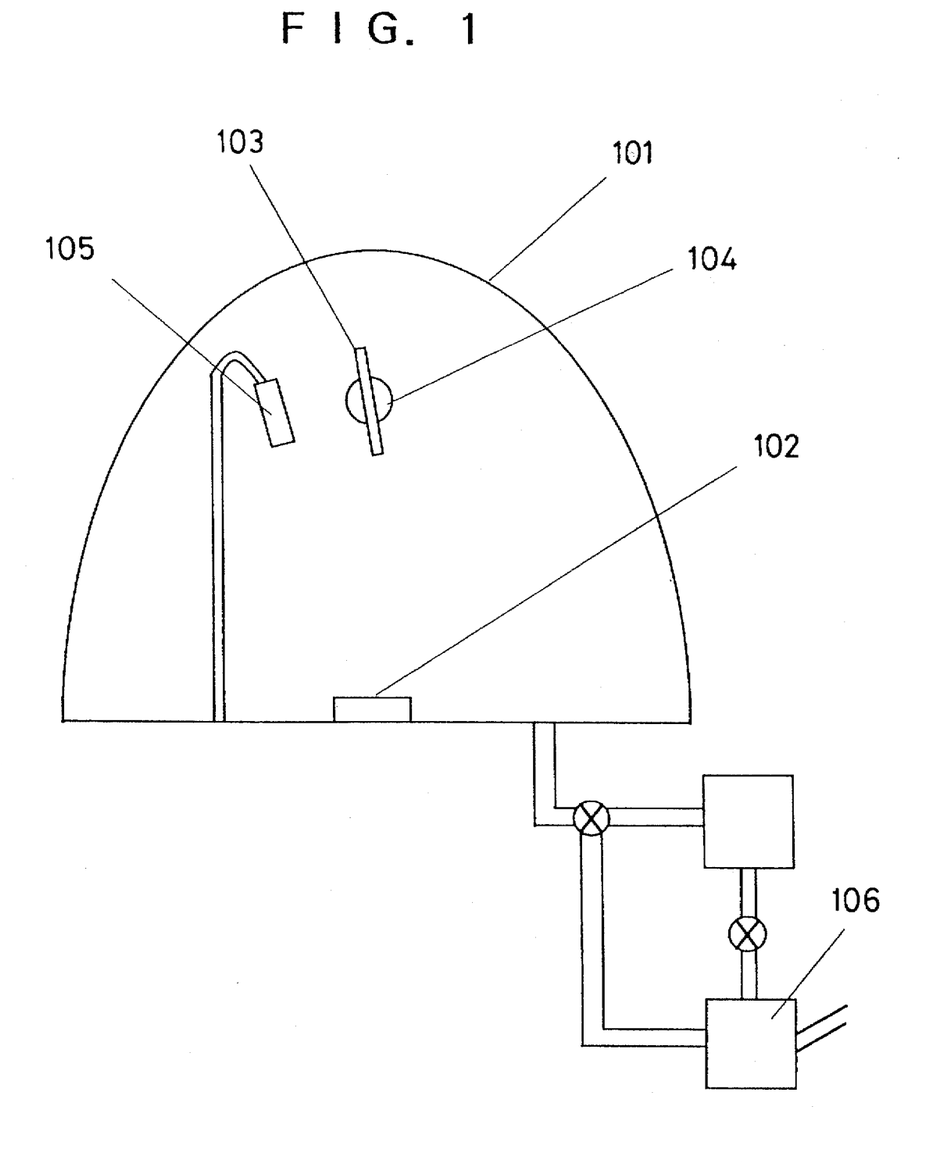
FIG. 1 is a schematic diagram showing an evaporation apparatus used for forming an orientation film according to the invention to introduce slightly tilting homeotropic orientation into liquid crystal.

FIG. 1 is a schematic diagram of an evaporation apparatus used for forming an orientation film effective to introduce the slightly tilting homeotropic alignment into the liquid crystal.

The apparatus for forming the orientation film is an evaporation apparatus using a main pump 106 such as a diffusion pump, a turbo molecular pump and a cryopump. A vacuum chamber 101 contains therein at least an evaporation source 102, a mechanism 104 for supporting a substrate at a given angle, and a film thickness gauge 105. In the present embodiment, the main pump 106 is composed of an oil diffusion pump, the evaporation source 102 is composed of a resistance-heating boat having a slit opening, and the film thickness gauge 105 is composed of a quartz oscillator gauge. However, these components are not related to the gist of the invention, and therefore can be replaced by equivalent components without any trouble.

A supporting holder 103 sets thereon a plurality of substrates so as to align surfaces thereof in the same plane, on which an orientation film is formed. Further, the supporting holder 103 is set to the holding mechanism 104 having a positioning and rotating mechanism so as to hold the surfaces at a given angle relative to a sputtering direction of evaporation particles from the evaporation source 102.

According to an experiment performed using the present embodiment, condition of forming the orientation film is set such that the incident angle V) is set variable at 54°, 52°, 60°, 69°, 78° and 82° defined relative to a direction parallel to the substrate, while the film thickness d (nm) is set variably at 20, 60, 100 and 140 nm measured during the film deposition by the film thickness gauge 105 disposed in a vertical direction at an equal distance between the evaporation source and the substrate. The produced samples are assembled into a cell, an orientation state of which is observed.

Figure 6:
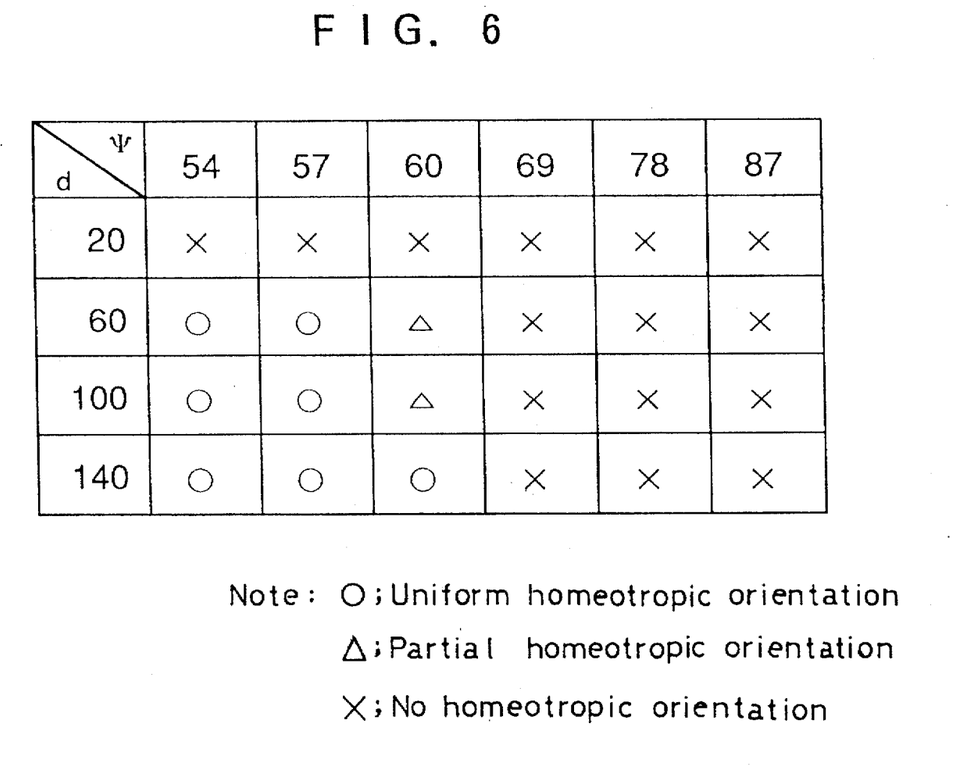
FIG. 6 is a diagram showing experimental results of homeotropic orientation performance while the incident angle of oblique evaporation and the film thickness are varied.

The experiment results are shown in FIG. 6. As seen from this table, the homeotropic orientation is obtained by the vacuum evaporation of the single layer at a specified range of the incident angle $\psi$ and the film thickness d.

In the present embodiment, the results of which are indicated by FIG. 6, the evaporation source uses powder composed of silicon monoxide. The evaporation source can use various inorganic materials such as silicon oxide including silicon monoxide and silicon dioxide, oxide including titanium oxide zirconium oxide and tantalum oxide, fluoride such as magnesium fluoride, sulfide such as zinc sulfide, and other materials of different elements or mixture or compound of different group elements including silicon and germanium without any problem. Namely, a slightly tilting homeotropic orientation is realized by the invention according to a surface structure obtained by the oblique evaporation at the specified condition of the film deposition. Practically, the invention can utilize almost any of the materials which can be evaporated to form the film. However, with regard to organic materials, the orientation state may be affected by polar interaction between the liquid crystal and the organic material, thereby failing to obtain the desired slight tilting. With regard to conductive materials such as metal, electric carriers flow along the surface to only enable whole on/off operation of the valve. Accordingly, the available materials are necessarily limited to an inorganic dielectric material and a semiconductor material. It is preferable to select the above listed materials which are easily evaporated to produce a desired surface structure.

The direction of the oblique evaporation is generally set opposite or parallel between a pair of the orientation film layers opposed to each other in the assembled cell. In the experiment of the present embodiment, the direction was set opposite. If the set direction is not opposite or parallel, twist distortion is created in the alignment of the liquid crystal molecules. It is difficult to obtain a desired phase modulation characteristic in response to an applied voltage. However, this does not negate the homeotropic orientation performance itself. If the set direction is opposite or anti-parallel, the alignment state is almost free of distortion under nonapplication of voltage. If the set direction is parallel, the alignment contains only spray distortion. In both cases, a very stable state can be obtained. Further, in both cases, the liquid crystal molecules decline into a unique direction perfectly restricted by the application of voltage to thereby avoid generation of discrimination lines. The tilt direction is not limited to the perfect opposite direction or parallel direction. A deviation of degrees does not affect optical and electric performance in the industrial application.

As seen from FIG. 6, according to the experimental condition of the present embodiment, the homeotropic orientation is obtained in the range where the incident angle $\psi$ is not more than 69° and the film thickness is not less than 20 nm.

Figure 2:
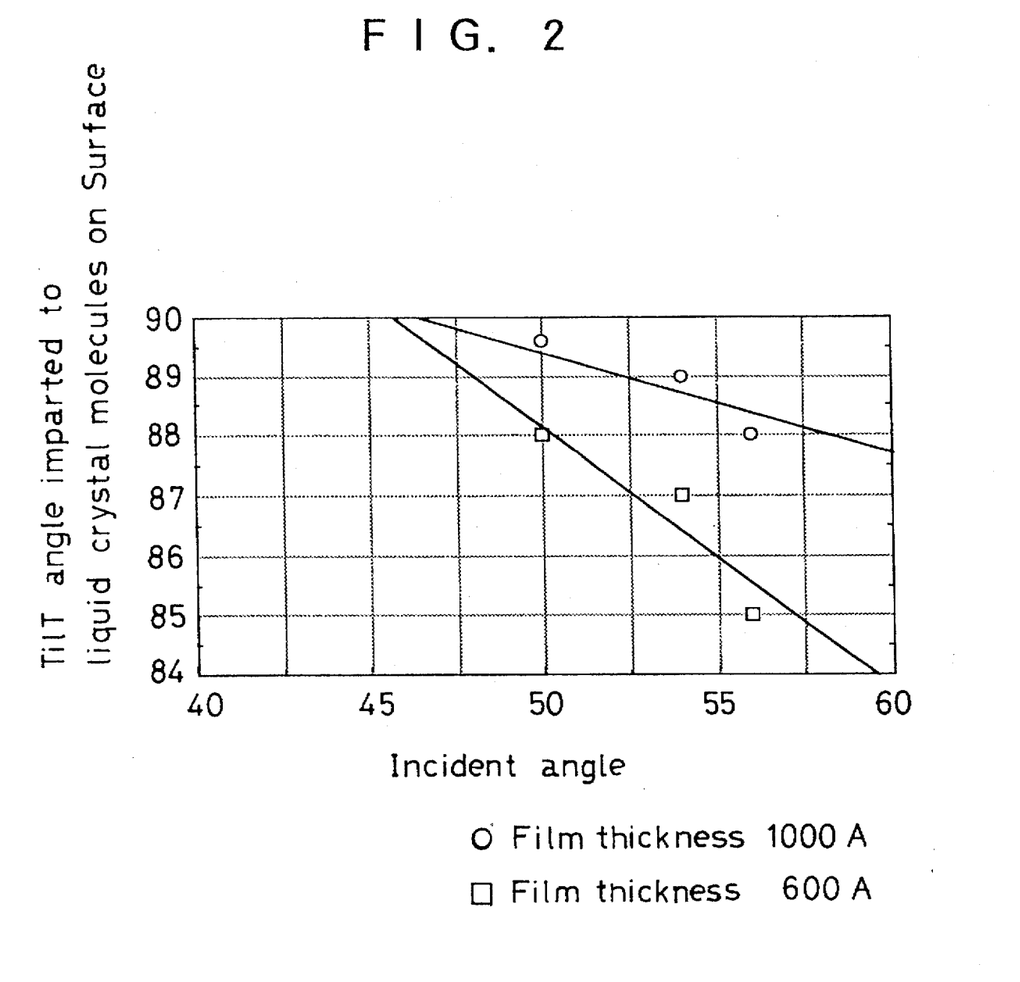
FIG. 2 is a graph plotting tilt angles measured when $\psi$ is varied at 50°, 54° and 57°.

However, in an extremely low incident angle range, only a small tilt is introduced into the alignment of the liquid crystal molecules. Therefore, when an electric field is applied to the liquid crystal, the director of the liquid crystal molecules is not controlled when distortion is created within the liquid crystal layer by torque due to coupling between the electric field and the negative dielectric anisotropy of the liquid crystal molecules. This causes a mixed state of plural domains having different molecule directors to thereby generate discrimination lines along borders of the domains. These discrimination line degrade the contrast in the directly viewed type of display. Consequently, the incident angle $\psi$ should be set equal to or more than 45°. A description is given for this with reference to FIG. 2. FIG. 2 is a graph plotting tilt angles while $\psi$ is varied at 50°, 54° and 57°. In this measurement, the orientation film has a thickness d of 60 and 100 nm. The cell is assembled such that the incident angles of the evaporation are set in the opposite relation to each other between the substrates in which the liquid crystal is sandwiched. The measurement is conducted by crystal rotation method to determine a mean director of the molecules within the liquid crystal layer. Using an extrapolation valve obtained from FIG. 2, it is understood that the slight tilt is not introduced into the alignment unless the incident angle $\psi$ is not less than 45°.

Further, it is not preferable to form an extremely thick evaporation film from an industrial point of view of increase in through-put. For this, practically, the film thickness is set not more than 500 nm.

As the results, the liquid crystal orientation film to introduce the homeotropic alignment is formed by vacuum-evaporating an inorganic material in a direction tilted from the normal direction of the substrate under the condition that the incident angle $\psi$ is set from 45° to 70° measured relative to a direction parallel to the substrate and that the film thickness d is set from 10 nm to 500 nm measured during the film deposition by the film thickness gauge disposed in a vertical direction at a distance equal to that between the evaporation source and the substrate. By such a manner, the oblique evaporation is carried out only once in the same manner as the underlayer process in the method of using coupling agent so as to realize the slightly tilting homeotropic orientation.

The inventive method is a remarkable one to introduce the slight tilting homeotropic orientation into the liquid crystal layer by one step of quite simple film forming. The orientation film is composed solely of the inorganic material to improve the reliability, particularly, the light resistance.

The inventive method can significantly improve the reliability of the liquid crystal electro-optical device such as the liquid crystal light valve used in the highly luminant projector and the like. Hereinafter, the description is given for the liquid crystal electro-optic device and the liquid crystal light valve utilizing the inventive method.

Figure 3:
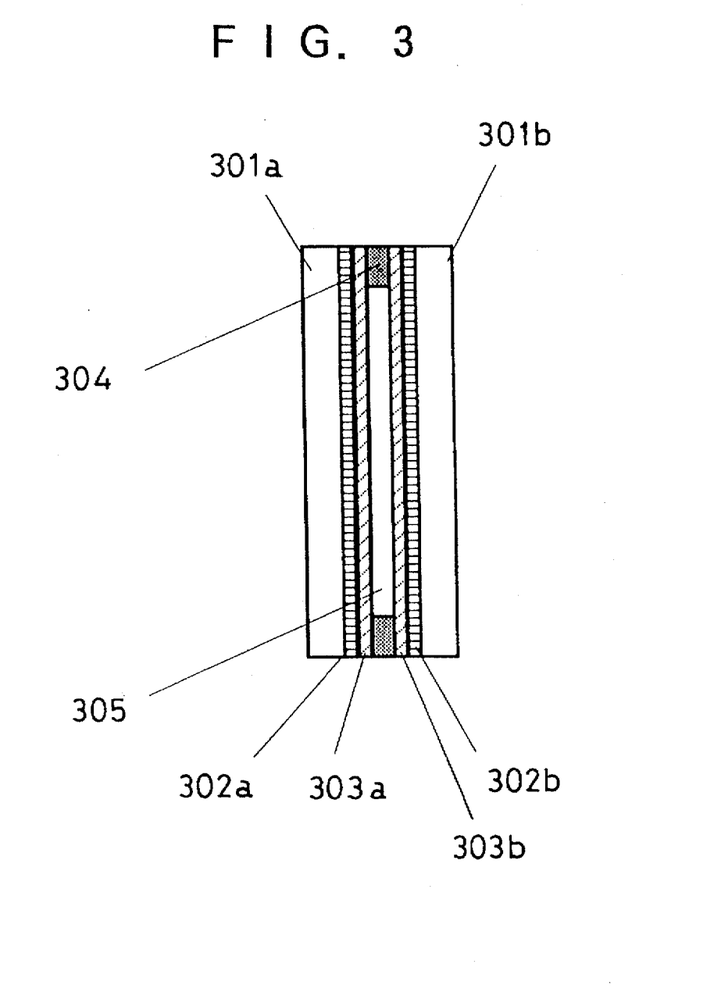
FIG. 3 is a schematic diagram showing structure of the inventive liquid crystal electro-optical device.

FIG. 3 is a schematic diagram showing a construction of the inventive liquid crystal electro-optical device. A pair of substrates 301a and 301b are provided to sandwich liquid crystal molecules, and are each composed of a transparent glass plate having a thickness of 1.1 mm. A pair of ITO transparent electrode layers 302a and 302b are formed on respective surfaces of the substrates 301a and 301b.

These substrates have orientation films 303a and 303b formed on the respective transparent electrodes. Then, the substrates are joined to each other through a spacer 304 to sandwich a liquid crystal layer 305. The orientation films 303a and 303b are formed according to a condition selected from the range specified in the embodiment 1. In this embodiment, the evaporation source uses powder of silicon monoxide, the incident angle $\psi$ is set to 54° relative to the parallel direction of the substrate, and the film thickness d is set to 100 nm measured during the film deposition by the film thickness gauge disposed at the same vertical distance as that between the evaporation source and the substrate. However, as mentioned in the embodiment 1, the film forming condition of the inventive orientation film is not limited to those selected in the present embodiment, but may be altered to satisfy the given condition. The used spacer is composed of an adhesive containing silicon dioxide particles (commercial product called "Shinshikyu SW" made by Shokubai Kasei Co., Ltd.) having a mean diameter of 5.0 μm to determine a gap between the pair of the substrates. The liquid crystal filled in the gap is composed of ZLI-4788-100 provided by Merck. However, the liquid crystal material is not limited to that and, may have various electric characteristics, optical characteristics and visco-elastic characteristics as long as the material is a composition having a negative dielectric anisotropy. Further, the gap is not limited at all.

Figure 4:
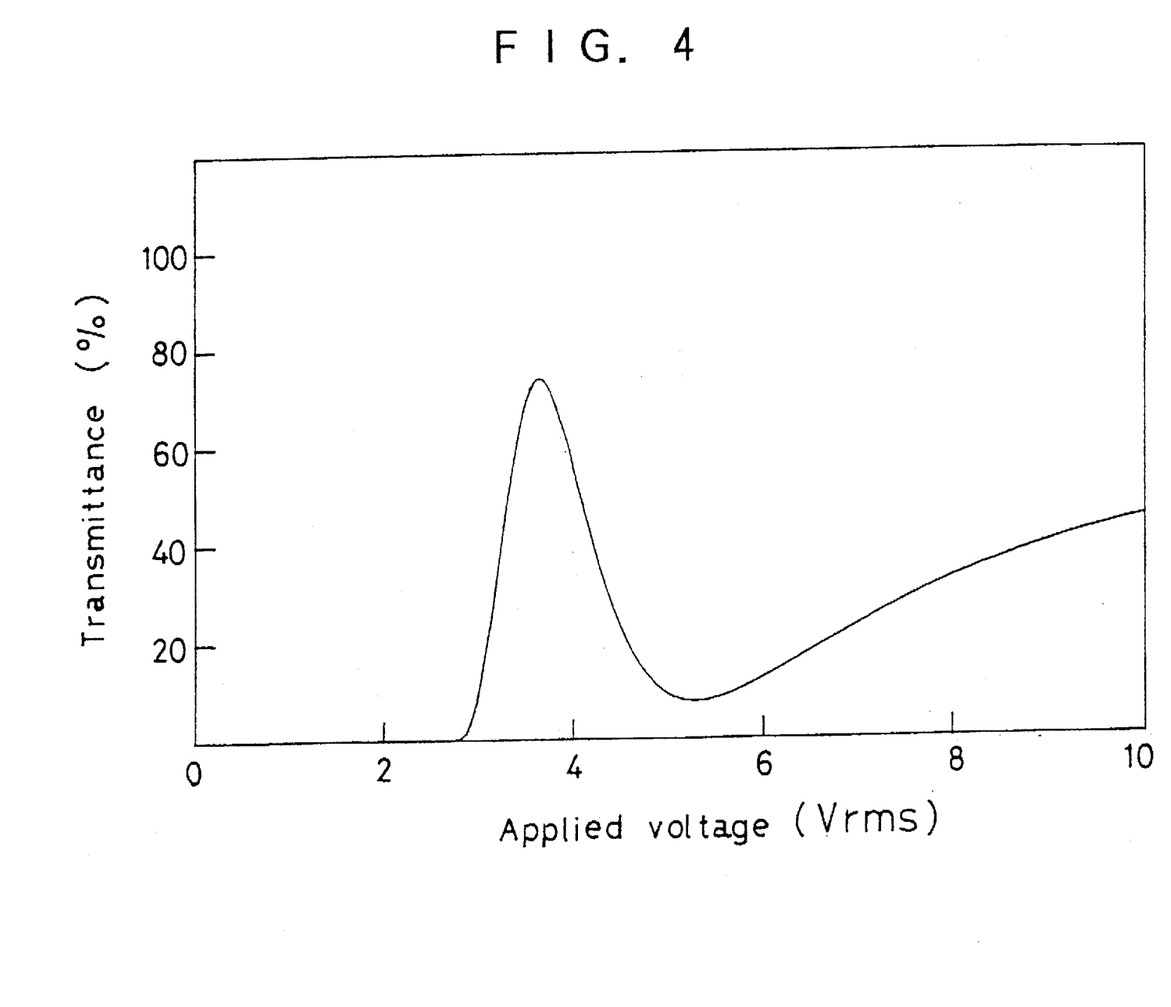
FIG. 4 is a graph plotting a voltage transmittance characteristic of the inventive liquid crystal electro-optical device.

The completed cell is disposed in cross Nicol, while an electric field is applied to measure variation of transmittance. FIG. 4 shows the results of the measurement. The white light is used in the measurement. As seen in FIG. 4, the liquid crystal electro-optical device oriented by the inventive method exhibits quite good sharpness and high contrast. Further, the inventive device can achieve display of quite high quality free of discrimination lines which would be frequently observed in the general liquid crystal device of the homeotropic orientation type and which would degrade the contrast.

In the liquid crystal electro-optical device produced in the present embodiment, the ITO electrode of the respective substrates is not divided so that the device may be used as a plane shutter or the like. The contrast is over 100:1 to thereby realize a quite high performance shutter.

The device of the embodiment utilizes the EBB effect so that the device is also utilized as a wavefront modulator and a color filter.

Further, the inventive orientation method can realize the EBB cell having the quite good sharpness. The ITO electrode of each substrate is divided to sufficiently enable matrix driving. However, the cell can be combined to the active matrix drive. As described above, the inventive method realizes the EBB cell of good sharp threshold characteristic. Therefore, the color display of the matrix type can be realized in combination with the active matrix driving.

The thus produced liquid crystal electro-optical device is formed with the orientation film layer composed of purely 14 inorganic material to thereby improve the light resistance. The device can be produced by steps simpler than the conventional homeotropic orientation technology to thereby increase the adhesion strength of the seal to improve the reliability.

Next, the description is given for an embodiment where the inventive orientation technology is applied to a liquid crystal light valve.

Figure 5:
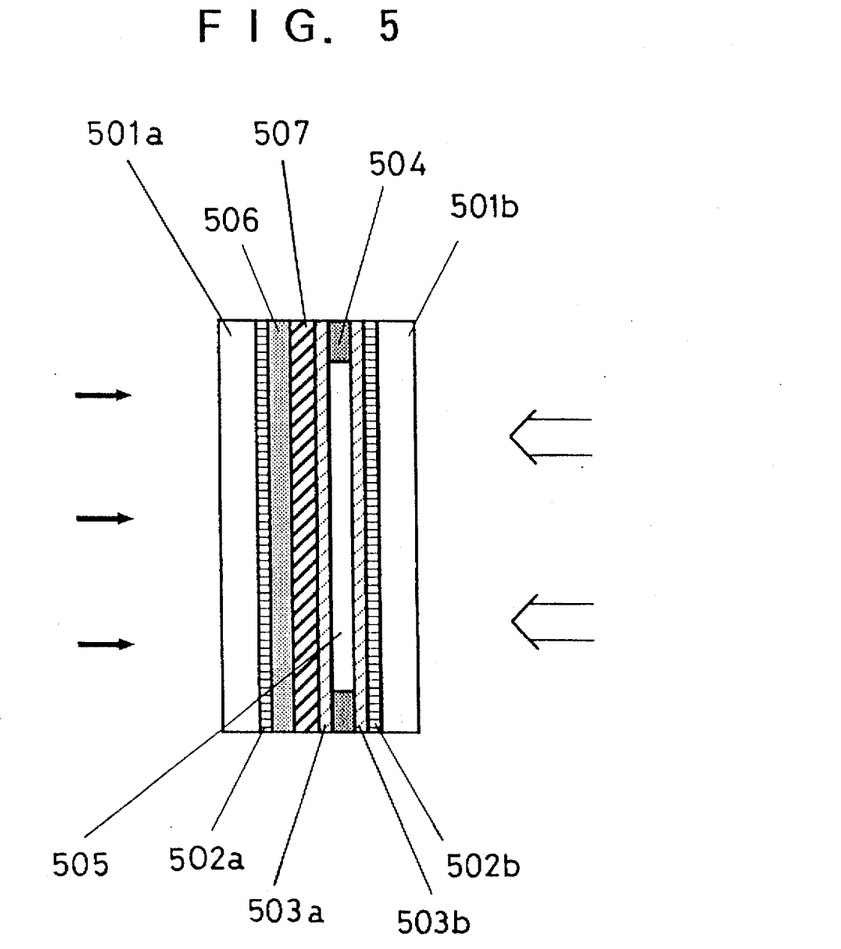
FIG. 5 is a schematic diagram showing construction of the inventive liquid crystal light valve.

FIG. 5 is a schematic diagram showing construction of the inventive liquid crystal light valve. The valve has a pair of substrates 501a and 501b each composed of a transparent glass plate having a thickness of 5 mm and being polished at a parallel flatness of λ/5 (λ indicates He—Ne laser wavelength) so as to sandwich liquid crystal molecules. ITO electrodes 502a and 502b are provided on surfaces of the respective substrates. A photo-conductive layer 506 composed of hydrized amorphous silicon (a-Si:H) is formed at a thickness of 5 μm on the transparent electrode layer 502a of the optical writing side. A mirror layer composed of a dielectric multi-layered mirror 507 is formed on the photo-conductive layer. Alternatively, the mirror layer may have a structure having metal films isolated from one another.

After forming orientation films 503a and 503b on the mirror layer 507 and the transparent electrode 502b, respectively, the pair of the substrates are joined by a spacer 504 to sandwich a liquid crystal layer 505 in a gap between the substrates. The orientation films 503a and 503b are formed in a manner similar to the embodiment 2, hence a detailed description is omitted. The spacer 504 is composed of an adhesive containing silicon dioxide particles (commercial product:ShinShiKyu SW, Shokubai Kasei Co., Ltd.) having a mean diameter of 5.0 μm to determine the gap. The liquid crystal held in the gap is composed of ZLI-4788-100 produced by Merck. However, the liquid crystal material is not limited to the above, but may be selected from compositions having various electric, optic, and visco-elastic characteristics as long as the compositions have negative dielectric anisotropy. The gap dimension is not limited to the above at all.

The assembled cell was disposed in a projection optical system of cross Nicol to perform a projection experiment. The device achieves very good resolution and high contrast, i.e., over 3000:1 as measured. Further, the device can achieve a display of very high quality free of discrimination lines which would be frequently observed in the general liquid crystal device of the homeotropic orientation type and which would degrade the contrast.

The thus constructed liquid crystal light valve uses the orientation film layer composed of purely inorganic material, which is immune to damage when exposed to strong reading light in contrast to general organic orientation film, thereby improving optical resistance. Further, the device can be produced by steps simpler than the general homeotropic orientation technology to improve adhesion strength of the seal and to improve the reliability.

The liquid crystal light valve of the present embodiment is applied to a liquid crystal projector featuring good reliability, durability and high luminance. The liquid crystal light valve is easily produced to thereby reduce the cost of the highly luminant liquid crystal projector.

The present invention can introduce the slightly tilting homeotropic orientation into the liquid crystal layer through a single and simple step by the use of a purely inorganic film. Accordingly, the optical resistance of the liquid crystal electro-optical device such as the liquid crystal light valve is significantly improved. This device is applied to the high luminance image projection apparatus, thereby featuring less frequent replacement of the valve and high reliability.

What is claimed is:

1. A method of introducing a slightly tilting homeotropic orientation to a liquid crystal material sandwiched by a pair of substrates and an orientation film formed along a boundary in contact with a layer of the liquid crystal, the method comprising: forming the orientation film by vacuum-evaporating an inorganic material in a given direction tilted from a normal direction of the substrate, such that an incident angle ψ of the inorganic material is set from 45° to 70° with respect to a direction parallel to the substrate and a thickness d of the orientation film is within the range of 60 nm to 500 nm as measured by a film thickness gauge disposed in a vertical direction at an equal distance between an evaporation source and the substrate during the forming of the orientation film.

2. A method of introducing a slightly tilting homeotropic orientation to a liquid crystal material according to claim 1; wherein the orientation film is formed of an oxide including at least one compound selected from the group consisting of silicon monoxide, silicon dioxide, a titanium oxide, a zirconium oxide, and a tantalum oxide.

3. A method of introducing a slightly tilting homeotropic orientation to a liquid crystal material according to claim 1; wherein the orientation film is formed of at least one compound selected from the group consisting of a fluoride compound and a sulfide compound.

4. A method of introducing a slightly tilting homeotropic orientation to a liquid crystal material according to claim 1; wherein the orientation film is formed of one of a single inorganic element and a mixture or compound containing at least one of silicon and germanium.

5. A method of introducing a slightly tilting homeotropic orientation to a liquid crystal material according to claim 1; wherein the orientation film has a thickness d within the range of above 60 nm to 500 nm.

6. A liquid crystal electro-optical device comprising: a liquid crystal material sandwiched by a pair of substrates; and an orientation film disposed along a boundary in contact with a layer of the liquid crystal material; wherein the orientation film is formed by vacuum deposition of an inorganic material in a given direction tilted from a normal direction of the substrate, wherein an incident angle ψ of the inorganic material is set from 45°0 to 70°0 with respect to a direction parallel to the substrate and a thickness d of the orientation film is set above 60 nm and no greater than approximately 500 nm as measured by a film thickness gauge disposed in a vertical direction at an equal distance between an evaporation source and the substrate during the forming of the orientation film, thereby introducing a slightly tilting homeotropic orientation such that molecules of the liquid crystal material have a slightly tilted director along the boundary.

7. A liquid crystal electro-optical device according to claim 6; wherein the slightly tilted director of the liquid crystal molecules is substantially opposite or parallel between the pair of substrates.

8. A liquid crystal electro-optical device according to claim 6; wherein the orientation film is composed of a compound selected from the group consisting of silicon monoxide, silicon dioxide, titanium oxide, zirconium oxide, tantalum oxide, magnesium fluoride, and zinc sulfide.

9. A liquid crystal electro-optical device according to claim 6; wherein the orientation film is formed essentially of a compound selected from the group consisting of a single inorganic element, a mixture or compound containing at least one of silicon and germanium.

10. A liquid crystal electro-optical device according to claim 6; wherein the orientation film has a thickness within the range of above 60 nm to 500 nm.

11. A liquid crystal light valve comprising: optical writing means; optical reading means; voltage applying means; a first glass substrate formed with a transparent electrode, a photo-conductive layer and a mirror layer disposed over the transparent electrode; a second glass substrate formed with a transparent electrode, the pair of glass substrates being opposed to each other; a liquid crystal orientation film formed on opposed surfaces of the pair of glass substrates; and a liquid crystal composition sealed between the glass substrates to form a liquid crystal optical modulation layer; wherein the liquid crystal orientation film is formed by vacuum-evaporating an inorganic material in a given direction tilted from a normal direction of the substrate, such that an incident angle $\psi$ of the inorganic material is set from 45° to 70° with respect to a direction parallel to the substrate and a thickness d of the liquid crystal orientation film is within the range of 60 nm to 500 nm as measured by a film thickness gauge disposed in a vertical direction at an equal distance between an evaporation source and the substrate during the forming of the orientation film to impart a slightly tilting homeotropic orientation into the liquid crystal optical modulation layer.

12. A liquid crystal light valve according to claim 11; wherein a liquid crystal composition used to form the liquid crystal layer is a composition having a negative dielectric anisotropy and a nematic phase at a room temperature, and the slightly tilted direction is one of substantially opposite or parallel between the substrates.

13. A liquid crystal light valve according to claim 11; wherein orientation film is composed of a compound selected from the group consisting of silicon monoxide, silicon dioxide, titanium oxide, zirconium oxide, tantalum oxide, magnesium fluoride, and zinc sulfide.

14. A liquid crystal light valve according to claim 11; wherein the orientation film is formed of a raw material composed mainly of a single inorganic element, or a mixture or compound containing an element including at least one of silicon and germanium.

15. A liquid crystal light valve according to claim 11; wherein the orientation film has a thickness within the range of above 60 nm to 500 nm.

16. A method of forming an orientation film having a slightly tilting homeotropic alignment, comprising the steps of: providing a pair of substrates for sandwiching a liquid crystal material layer; and vacuum evaporating an orientation film composed of an inorganic material onto at least one of the substrates at a predetermined angle of incidence deviating from a normal direction of the substrate, the predetermined angle of incidence being within the range of approximately 45° to 70° with respect to a plane parallel to the substrate, and a thickness of the orientation film being within the range of approximately 60 nm to 500 nm.

17. A method of forming an orientation film according to claim 16; wherein the orientation film is formed of an oxide including at least one compound selected from the group consisting of silicon monoxide, silicon dioxide, an oxide of titanium, an oxide of zirconium, and an oxide of tantalum.

18. A method of forming an orientation film according to claim 16; wherein the orientation film is formed of at least one compound selected from the group consisting of magnesium fluoride and zinc sulfide.

19. A method of forming an orientation film according to claim 16; wherein the orientation film is formed of one of a single inorganic element and a compound containing at least one of silicon and germanium.

20. A liquid crystal electro-optical device comprising: a pair of opposing substrates; a liquid crystal material layer disposed between the pair of opposing substrates; and an orientation film having a slightly tilting homeotropic alignment formed on at least one of the substrates; wherein the orientation film comprises a vacuum evaporated inorganic material deposited at a predetermined angle of incidence slightly tilted from a normal direction of the substrate, the predetermined angle of incidence being within the range of 45° and 70° with respect to a direction parallel to the substrate, and the orientation film having a thickness within the range of 60 nm to 500 nm such that a slightly tilting homeotropic orientation is introduced to molecules of the liquid crystal material.

21. A liquid crystal electro-optical device according to claim 20; wherein the orientation film has a thickness within the range of above 60 nm and 500 nm.

22. A liquid crystal electro-optical device according to claim 20; wherein the slightly tilted direction of the liquid crystal molecules is substantially opposite or parallel between the pair of substrates.

23. A liquid crystal electro-optical device according to claim 20; wherein the orientation film is composed of a compound selected from the group consisting of silicon monoxide, silicon dioxide, titanium oxide, zirconium oxide, tantalum oxide, magnesium fluoride, and zinc sulfide.

24. A liquid crystal electro-optical device according to claim 20; wherein the orientation film is formed of a raw material composed essentially of one of a single inorganic element and a compound containing at least one of silicon and germanium.

25. A liquid crystal light valve comprising: optical writing means; optical reading means; voltage applying means; a first transparent substrate having a transparent electrode, a photoconductive layer and a mirror layer formed thereon; a second glass substrate having a transparent electrode formed thereon, the first and second transparent substrates being opposed to each other; a liquid crystal orientation film formed on at least one of opposing surfaces of the first and second transparent substrates; and a liquid crystal composition sealed between the transparent substrates to form a liquid crystal optical modulation layer; wherein the liquid crystal orientation film comprises a vacuum-evaporated inorganic material deposited onto the at least one opposing surfaces at a predetermined angle of incidence slightly tilted from a normal direction of the respective substrate, the predetermined angle of incidence being within the range of 45° to 70° with respect to a direction parallel to the substrate, and the orientation film having a thickness within the range of 60 nm to 500 nm, so as to introduce a slightly tilting homeotropic orientation into the liquid crystal optical modulation layer.

26. A liquid crystal light valve according to claim 25; wherein the orientation film has a thickness within the range of above 60 nm and 500 nm.

27. A liquid crystal light valve according to claim 25; wherein the liquid crystal layer is formed of a liquid crystal composition having a negative dielectric anisotropy and a nematic phase at a room temperature, and the slightly tilted direction is one of substantially opposite or parallel between the substrates.

28. A liquid crystal light valve according to claim 25; wherein the orientation film is composed of a compound selected from the group consisting of silicon monoxide, silicon dioxide, a titanium oxide, a zirconium oxide, a tantalum oxide, magnesium fluoride, and zinc sulfide.

29. A liquid crystal light valve according to claim 25; wherein the orientation film is formed essentially of one of a single inorganic element and a compound containing at least one of silicon and germanium.

30. A liquid crystal electro-optical device comprising: a liquid crystal material sandwiched by a pair of substrates; and a pair of opposing orientation films each disposed along a boundary in contact with a layer of the liquid crystal material; wherein the orientation films are formed by vacuum deposition of an inorganic material in a given direction tilted from a normal direction of the substrate, wherein an incident angle $\psi$ of the inorganic material is set from 45° to 70° with respect to a direction parallel to the substrate and a thickness d of the orientation films is set above 60 nm and no greater than approximately 500 nm as measured by a film thickness gauge disposed in a vertical direction at an equal distance between an evaporation source and the substrate during the forming of the orientation films, thereby introducing a slightly tilting homeotropic orientation such that molecules of the liquid crystal material have a slightly tilted director along the boundary; and wherein at least one of the incident angle $\psi$ and the film thickness d is different in each of the opposed orientation films.

31. A liquid crystal light valve comprising: optical writing means; optical reading means; voltage applying means; a first glass substrate formed with a transparent electrode, a photo-conductive layer and a mirror layer disposed over the transparent electrode; a second glass substrate formed with a transparent electrode, the pair of glass substrates being opposed to each other; a liquid crystal orientation film formed on opposed surfaces of the pair of glass substrates; and a liquid crystal composition sealed between the glass substrates to form a liquid crystal optical modulation layer; wherein the liquid crystal orientation film is formed by vacuum-evaporating an inorganic material in a given direction tilted from a normal direction of the substrate, such that an incident angle $\psi$ of the inorganic material is set from 45° to 70° with respect to a direction parallel to the substrate and a thickness d of the liquid crystal orientation film is within the range of 60 nm to 500 nm as measured by a film thickness gauge disposed in a vertical direction at an equal distance between an evaporation source and the substrate during the forming of the orientation film to impart a slightly tilting homeotropic orientation into the liquid crystal optical modulation layer; and wherein at least one of the incident angle $\psi$ and the film thickness d is different for each of the opposed orientation films.

32. A liquid crystal electro-optical device comprising: a pair of opposing substrates; a liquid crystal material layer disposed between the pair of opposing substrates; and an orientation film having a slightly tilting homeotropic alignment formed on at least one of the substrates; wherein the orientation film comprises a vacuum evaporated inorganic material deposited at a predetermined angle of incidence slightly tilted from a normal direction of the substrate, the predetermined angle of incidence being within the range of 45° and 70° with respect to a direction parallel to the substrate, and the orientation film having a thickness within the range of 60 nm to 500 nm such that a slightly tilting homeotropic orientation is introduced to molecules of the liquid crystal material; and wherein at least one of the incident angle $\psi$ and the film thickness d is different in each of the opposed orientation films.

33. A liquid crystal light valve comprising: optical writing means; optical reading means; voltage applying means; a first transparent substrate having a transparent electrode, a photoconductive layer and a mirror layer formed thereon; a second glass substrate having a transparent electrode formed thereon, the first and second transparent substrates being opposed to each other; a liquid crystal orientation film formed on at least one of opposing surfaces of the first and second transparent substrates; and a liquid crystal composition sealed between the transparent substrates to form a liquid crystal optical modulation layer; wherein the liquid crystal orientation film comprises a vacuum-evaporated inorganic material deposited onto the at least one opposing surfaces at a predetermined angle of incidence slightly tilted from a normal direction of the respective substrate, the predetermined angle of incidence being within the range of 45° to 70° with respect to a direction parallel to the substrate, and the orientation film having a thickness within the range of 60 nm to 500 nm, so as to introduce a slightly tilting homeotropic orientation into the liquid crystal optical modulation layer; and wherein at least one of the incident angle $\psi$ and the film thickness d is different for each of the opposed orientation films.

* * * * *